Patented Apr. 30, 1946

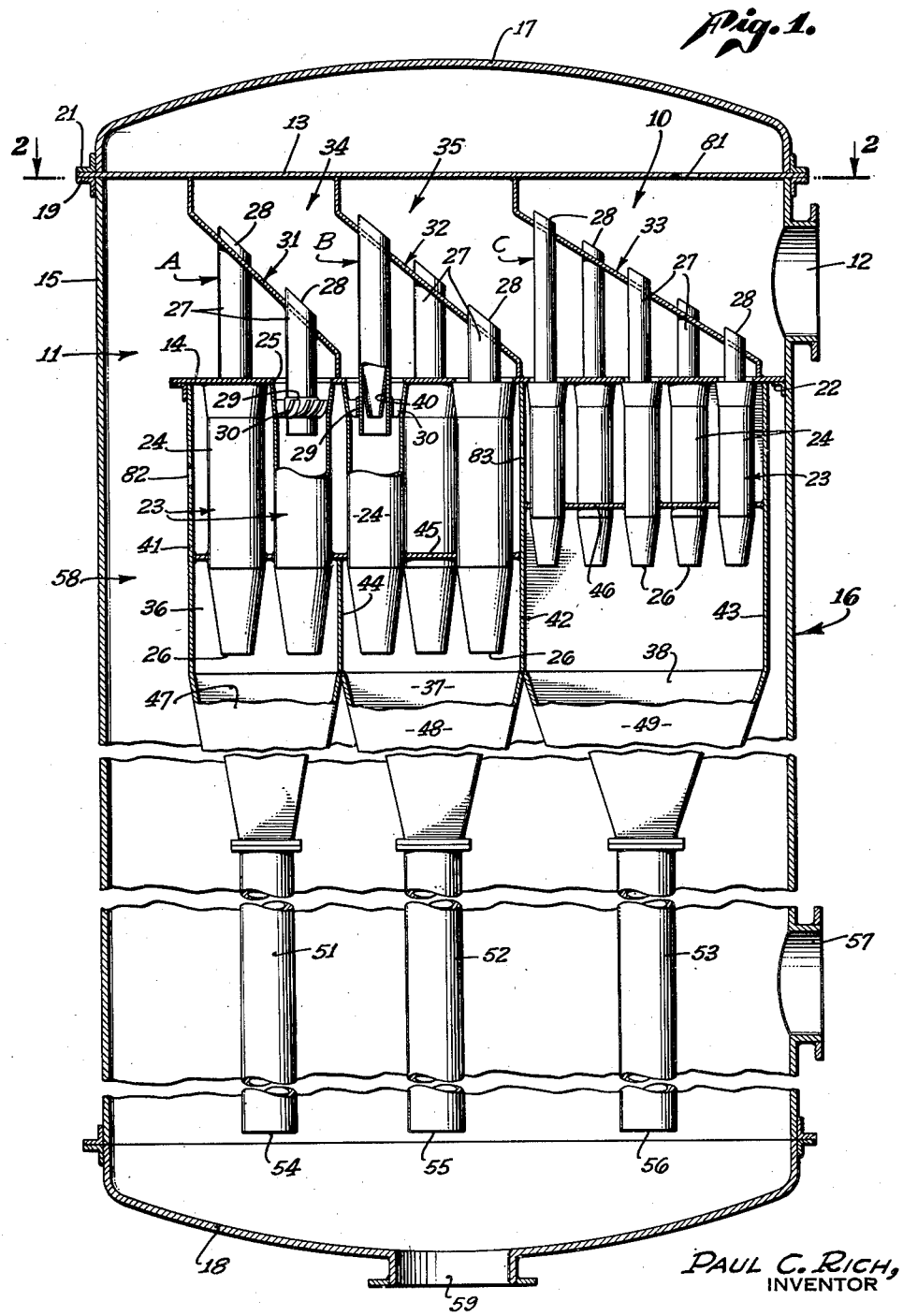

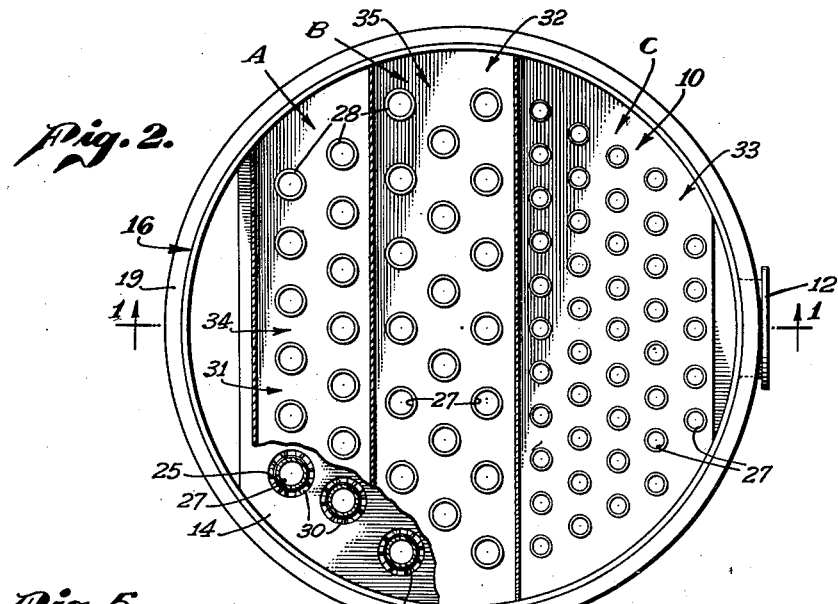
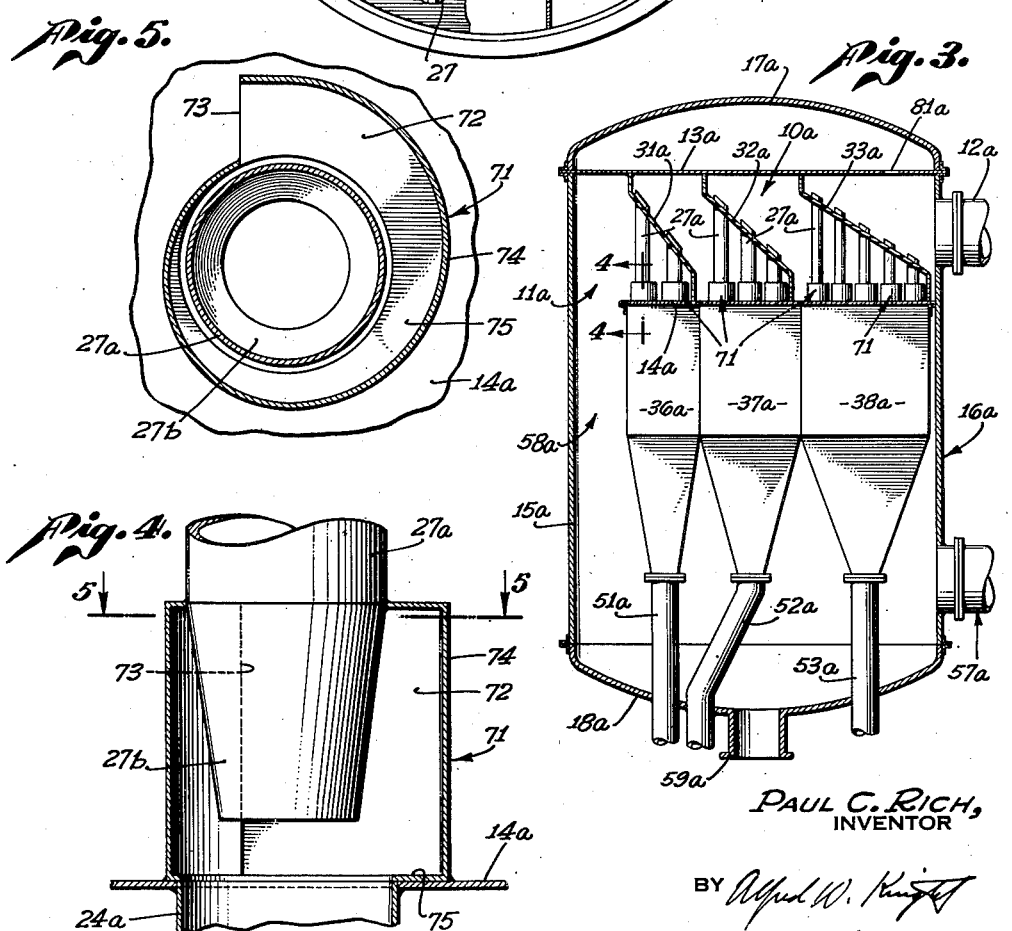

2,399,509

UNITED STATES PATENT OFFICE 2,399,509

MULTISTAGE CENTRIFUGAL SEPARATING APPARATUS

Paul C. Rich, Los Angeles, Calif., assignor to Western Precipitation Corporation, Los Angeles, Calif., a corporation of California Application September 9, 1941, Serial No. 410,158

1 Claim. (Cl. 183—34)

The present invention relates generally to centrifugal gas cleaning apparatus adapted to separate suspended solid or liquid particles, commonly termed dust or mist, from a stream of gas; and it relates more particularly to a multi-stage separating apparatus in which the gas to be cleaned is passed through successive cleaning stages.

In equipment of the well-known centrifugal or "cyclone" type, the gas to be cleaned is passed through a tubular unit, either cylindrical or conical, to separate suspended particles by centrifugal force. It is customary to use a separating unit of relatively small diameter, for example, 3 to 12 inches, in order to obtain a high efficiency of separation. This makes the capacity of the unit comparatively small, and it is then necessary to place a plurality of such units in parallel in each stage in order to obtain the required gas handling capacity in the apparatus.

Multi-stage apparatus is used when it is desired to obtain effective cleaning of a gas which is heavily loaded with suspended material and it is sometimes desirable to use separating units of progressively increasing efficiency of separation in the successive stages, as for example, to use tubular separating units of progressively decreasing diameter, in order to obtain a more effective separation of the finer particles. Multi-stage separators are also used when it is desired to obtain a combined separating and classifying action and in such cases also the successive stages may be provided with separating units of progressively increasing collecting efficiency.

An important object of this invention is to provide a compact multi-stage separating apparatus in which each stage comprises a plurality of tubular separating units in parallel.

Another object of the invention is to provide a multi-stage centrifugal separating apparatus of the type in which each stage comprises a plurality of tubular centrifugal separating units in parallel, the apparatus being readily adapted for enclosure in a housing with the successive stages in horizontally spaced relation and with the housing walls forming part of the passage providing communication between the successive stages.

A further object of the invention is to provide a multi-stage separating apparatus which is particularly adapted to the cleaning of gases highly loaded with suspended material.

In ordinary installations, the exterior of a separating unit is at atmospheric pressure, the pressure inside the unit is above or below atmospheric pressure by a small amount, ordinarily less than one pound per square inch. The pressure difference is ordinarily only that created by the pressure or draft required to maintain a gas flow through the unit. Under these circumstances, the separating units can be made with relatively thin walls, except when excessive wear is provided for thin sheet-metal stock can be used. For example, 16 gauge material is often used since it can be readily formed to the desired shape. Light weight construction provides adequate strength with minimum labor and material costs. Of course, thicker walls are sometimes provided for the separator units when it is desired to provide a longer life in case of abrasive dust or corrosive gas constituents.

However, this conventional construction is not possible when the gas stream to be cleaned is maintained at a relatively high pressure, say 50 lbs. per square inch, since the separator walls are unable to withstand such high pressure with the exterior at atmospheric pressure. If the units are made of thicker material, the cost of manufacture becomes unduly expensive because of the difficulty of forming the units and the inlet and outlet connections from the heavier material. In addition, greater care is necessary in making welded or bolted joints to prevent gas leakage at the many joints involved in a multiple unit apparatus. Another drawback is the danger of breakage under pressure when abrasive dusts are handled, as the units may wear thin in some place and explode, endangering persons nearby.

It is therefore another important object of my invention to provide novel multi-stage apparatus for cleaning a gas stream maintained at a pressure materially above atmospheric.

It is also an object of my invention to provide high pressure gas cleaning apparatus of the cyclone type in which the several separating stages are subjected to very low pressure differentials between inside and outside, thus eliminating danger of gas leakage or rupture of the units and associated compartments and eliminating expensive construction requiring material resistant to high pressure.

A further object is to provide a multi-stage centrifugal separating apparatus that is mounted, or adapted to be mounted, in the upper portion of a chamber in which a gas is brought into contact with a body of divided solid material, as for example a solid catalyst, the separating apparatus serving to remove entrained solid particles from the gases leaving the chamber.

How the above objects and advantages of my invention, as well as others not specifically mentioned, are attained, will be more readily apparent by reference to the following description and the annexed drawings, in which:

Fig. 1 is a vertical median section of a multi-stage separating apparatus according to my invention, taken substantially along line 1—1 of Fig. 2;

Fig. 2 is a partly broken away horizontal section thereof taken along line 2—2 in Fig. 1;

Fig. 3 is a partly sectional elevational view of a variational form of my invention;

Fig. 4 is a partial sectional elevation of one of the separating units of Fig. 3 taken along line 4—4 in Fig. 3; and Fig. 5 is a horizontal section of one of the separating units of Fig. 3 taken substantially along line 5—5 in Fig. 4.

There is shown in Fig. 1 gas cleaning apparatus constructed according to my invention for the removal of solid particles suspended in a gas stream. The apparatus comprises wall means defining a substantially horizontally extending enclosure 10 having an inlet 11 at one end and an outlet 12 at the other end. In this particular example, the wall means comprises an upper wall 13 and a lower wall 14 and portions of the sidewall 15 of a housing 16. The housing 16 is shown as cylindrical in shape and is provided with upper and lower dome-shaped ends 17 and 18 respectively, suitably secured to the cylindrical end portions of the housing. The upper wall 13 of enclosure 10 is shown extending completely across the housing 16 and is secured between flanges 19 and 21 which hold the upper end 17 to the housing. It will be understood that housing 16 may be of any desired shape and dimensions, the cylindrical form shown being advantageous, however, for use on gases at high pressure.

The walls 13 and 14 are substantially horizontally extending and are vertically spaced. The lower wall 14 is suitably secured to the cylindrical side wall 15 of the housing 16 and is supported therein. For example, the lower wall 14 may be suitably supported on and secured to a shelf 22 supported on the wall 15 of the housing and extending partially around the housing. It will be noted that the wall 14 extends only partly across the housing 16 in order to provide the inlet opening 11 between the end of the wall 14 and the side wall 15 at a position horizontally removed from the outlet 12. In this particular example, the outlet 12 communicating with the enclosure 10 is provided in side wall 15 of the housing 16.

The apparatus further comprises a plurality of successive centrifugal separating stages indicated at A, B and C, arranged in a horizontally extending row, or in horizontal alignment, along the enclosure 10 and spaced from one another horizontally in a direction along the passage 10. Each of the separating stages comprises a plurality of tubular centrifugal separating units indicated at 23. Since the separating units in each stage may be of similar construction, only a separating unit in the stage indicated at A, the first stage, will be fully described.

The separating units 23 may be constructed according to various well-known designs. Each centrifugal separating unit is shown, for example, as comprising a cylindrical tube 24 suspended from the wall 14 and open at its upper end as at 25 to provide gas inlet means for the units which communicate with the enclosure 10.

The lower end of each unit 24 preferably tapers to a material discharge opening 26 which is open to communication with a material collecting compartment to be described subsequently. Located coaxially of each unit 24 is a gas outlet means provided by a gas outlet tube 27 having a gas outlet opening 28 at its upper end.

As may best be seen from the unit broken away in Fig. 1, and from Fig. 2, there is located adjacent the lower end of each outlet tube 27 a ring 29 having thereon a plurality of curved vanes 30 which are inclined downwardly in one circumferential direction, in a generally helical manner, and extend radially from the ring 29 to the wall of the unit 24. Ring 29 and its attached vanes 30 may be held in place in any suitable manner, as for example by bolting or welding to the outlet tube 27. These vanes impart to the incoming gas stream the necessary whirling motion to bring about separation of the suspended material by centrifugal action as is well known in the art.

In operation, the gas stream carrying the small particles in suspension enters each unit through the gas inlet means or opening 25 and is given a whirling motion by passage over the vanes 30. The whirling gas stream moves downwardly in each unit 23 and the particles of material are thrown outwardly against the separator walls by centrifugal action, the particles collecting on the wall and discharging downwardly through the material outlet opening 26. The gas stream then moves upwardly and leaves the separating unit 24 by passing through outlet tube 27 to outlet opening 28 vertically above the inlet opening 25.

Each of the stages A, B and C is provided with a separate partition indicated at 31, 32 and 33 respectively. The partitions are spaced horizontally from one another and extend completely across enclosure 10 and slope downwardly toward the outlet end of the enclosure. The partitions 31, 32 and 33 are located above the separating stages A, B and C respectively and separate the gas inlet openings 25 of all the units in a stage from the gas outlet openings 28. The respective upper and lower ends of these partitions are secured to the walls 13 and 14, the sides thereof being secured to the walls 15, all in a gas tight manner. In this particular instance, the gas outlet tubes 27 are shown extending through the corresponding partition of a stage and communicating with the enclosure 10 above the corresponding partition.

It will also be noted that the partition means or baffle means 31, 32 and 33 in the enclosure 10 extending over the row of separate stages cooperate with upper and lower wall means 13 and 14 and with the side-wall means 15 to define a plurality of successive horizontally aligned chambers or inlet headers for the corresponding stages, two adjacent headers being indicated at 34 and 35. It will be noted that the gas inlet means of the associated units of stage B communicate with the corresponding chamber or inlet header 34 bounded by the underside of the partition 32 and that the gas outlet means of the associated units of stage B communicate with the next chamber or inlet header 35 in the series bounded by the upper side of the partition 32.

The material discharge openings 26 of the units associated with each stage communicate with a separate material collecting compartment provided for each stage. The compartments are indicated at 36, 37 and 38 for the stages A, B and C respectively. The material collecting compartments are defined by vertically extending partition means 41, 42 and 43 depending from the lower horizontal partition 14, and by short, vertically extending partition means 44 separating the hoppers or collecting compartments 36 and 37. The compartments 36, 37 and 38 are closed at their ends by the side wall 15 of housing 16. In view of the fact that it is unnecessary for the material collecting compartments to extend very far above the material discharge openings 26, the upper ends of the compartments 36, 37 and 38 may be closed by horizontally extending partition means as indicated at 45 and 46.

The respective compartments are provided with conical bottoms 47, 48 and 49 to which are respectively connected material delivery tubes 51, 52 and 53. The tubes 51, 52 and 53 may extend through the housing 16 to a delivery position remote therefrom and may be provided with suitable valve mechanisms well known in the art whereby collected material may be removed from the tubes without upsetting the pressure conditions in the various units. In this particular example the tubes are shown terminating in the housing at positions downwardly removed from the collecting compartments with their ends open as indicated at 54, 55 and 56.

In the particular embodiment of my invention which I have illustrated in Figs. 1 and 2, the housing 16 is shown provided with a gas inlet opening 57 located substantially vertically below the gas outlet opening 12, preferably near the lower end of the housing 16 and above the level of the lower ends of the tubes 51, 52 and 53. Thus gas enters the housing 16 through the opening 57 and flows across the housing and upwardly through a vertically extending passage 58 defined between the partition 41 and side wall 15, into inlet opening 11 of enclosure 10.

The apparatus is particularly adapted for use in processes wherein it is desired to subject a stream of gas to contact with a body of finely divided solid material maintained in the lower part of the housing 16. The gas entering the housing 16 through the opening 57 intimately commingles with the divided solid material to produce the desired contact within the housing. Some of the solid material is carried in the form of a suspension with the outgoing gaseous fluid upwardly through the passage 58 and into the enclosure 10 through the inlet opening 11. The gas with the suspended solid particles is passed successively through the series of separating stages A, B and C, and leaves the housing 16 through the outlet opening 12 in a clean condition. The separated solid material returns to the bottom of the housing 16 through tubes 51, 52 and 53 to be used again. Thus the body of separated material, not shown, maintained in the bottom of the shell 16 above the level of the bottom of the pipes 51, 52 and 53, provides a dust seal, whereby the pressure differentials in the collecting compartments may be maintained. An outlet opening 59 is provided in the bottom of the housing 16 for the removal of material therefrom, suitable means not shown being provided for closing the opening or transporting material therefrom.

As pointed out previously, it is generally desirable to increase the efficiency of separation from stage to stage. It will be noted that separating units in stages A and B are shown as having the same size. In order to increase the efficiency of stage A over stage B, the effective diameter of the outlet tube 27 of each unit 23 in stage B is decreased. This is accomplished by suitably securing restrictor 40 in the form of an open ended truncated cone in each gas outlet tube 27 of stage B. The efficiency of stage C is increased over that of stage B by providing smaller diameter separating units having higher efficiency than stage B as provided with the restrictors. Obviously, the area occupied by each stage in the plane of wall 14 may be varied from that shown to accommodate different numbers or sizes of tubes in each stage to obtain a desired efficiency in each stage.

It will be noted that the gas flows directly from one stage to the other. Thus outlet tubes 27 of stage A communicate directly with chamber 34 and inlet openings 25 of stage B also communicate directly with said chamber. The same condition exists with respect to outlet tubes 27 of stage B and inlet openings 25 of stage C in that they both communicate directly with chamber 35. This construction increases the efficiency of the apparatus by the elimination of the draft loss resulting from long and tortuous passages between the outlet and inlet openings of successive stages.

Figs. 3, 4 and 5 illustrate a variational form of apparatus for dust collection, comprising a housing 16a provided with vertically spaced gas inlets and outlets 57a and 12a comparable to those shown in Fig. 1, but differing in the type of centrifugal dust separating units employed and in the disposition of the dust delivery tubes. The apparatus is further provided with vertically spaced upper and lower wall means 13a and 14a co-operating with one another and with the sidewall means 15a to define a substantially horizontally extending enclosure 10a communicating with the outlet opening 12a. The outlet tubes of the tubular separating units are indicated at 27a and each unit may be substantially the same as described in connection with Fig. 1 except for the change in the inlet means to provide for the whirling motion of the gas.

Thus, as shown in Figs. 4 and 5, inlet means 71 of each unit comprises an involute or spiral section 72 having a gas inlet opening 73 that lies in a vertically extending plane. The involute section gives the gas a circular motion before it moves downwardly into the cylindrical portion of the separating unit indicated at 24a, because of the spiral form of vertically extending walls 74 which are seen in Fig. 5 as viewed in plan. This vertical wall is connected at its lower edge to the cylindrical portion 24a of each separating unit by a transition strip 75 of tapering width.

The gas outlet tube 27a for each unit is shown tapered at its lower end as indicated at 27b, and extends downwardly into the involute inlet section for a short distance to prevent gas from flowing directly from the inlet opening into the outlet tube. The involute inlet section of each tube operates to produce the whirling motion of the gas for the same purpose as the vanes 30 of Fig. 1.

The gas inlet and gas outlet openings of units of each stage are separated by the sloping partitions 31a, 32a and 33a in the same manner as described in connection with Fig. 1. Each separating stage is also provided with a separate material collecting compartment indicated at 36a, 37a and 38a comparable to the compartments of Fig. 1, except that they are shown with end wall means separate from the side-wall of the housing 16a. Obviously, the end walls of the compartments may comprise the side wall of the housing 16a as in Fig. 1. In Fig. 3, the dust delivery tubes indicated at 51a, 52a and 53a are shown extending through bottom wall 18a of the housing to the exterior thereof where they may be connected through suitable valve means to a storage compartment or to other suitable means.

In this form of my invention it is contemplated to use the lower portion of the housing 16a as a settling chamber for the collection of solid particles from the dust-laden gas entering through the opening 57a. This form of construction is particularly useful with gases heavily laden with dust in that a certain proportion of the dust separates out by gravity as the dust-laden gas flows across the lower portion of the housing 16 and then upwardly through vertically extending passage 58a to the inlet opening 11a of the enclosure 10a. Dust collected in the lower portion of the housing 16a may be removed through outlet opening 59a which is either sealed or provided with a suitable delivery tube not shown.

Referring again to Figs. 1 and 3 it will be noted that the sloping partitions 31, 32 and 33, and the corresponding partitions 31a, 32a and 33a, provide for even flow of gas into and out of the individual separating units. The maximum cross-sectional area of the enclosure 10 or 10a, occurs at the forward end of each stage and the cross-section decreases to a minimum at the rear end thereof. The same relation holds true with respect to the passage of gas from the openings in the gas discharge tubes. The minimum cross-section of the passage occurs at the discharge position of the forward tubes in each stage and increases to a maximum at the position of discharge of the rear tubes thereof. This increases the efficiency of the apparatus by equalizing the flow through the parallel tubes in each stage and generally decreasing pressure drop in the apparatus.

The forms of apparatus illustrated in Figs. 1 and 3 are particularly adapted for cleaning of gases at high pressure and it is for that reason that the housings 16 and 16a and the external fittings therefor have been shown as heavy walled in order to resist high internal pressures. The separating units and the various partitions and tubes located within the housings may be of conventional light-weight construction.

In referring to light-weight or conventional construction, reference is made to the thickness of material used for the separating units and the co-operating partition means within the housings, when that thickness is determined independently of the gas pressures, as would be the case if the exterior of the units were maintained at atmospheric pressure and the gas stream within the apparatus were substantially at atmospheric pressure. Normally the pressure differential on the walls of the unit are then only those differentials created by the draft necessary for passing gas through the apparatus. Under these circumstances, the thickness of the material used is independent of the gas pressure and is dictated solely by the dead loads in the apparatus by other considerations, such as rigidity and long life. It will be appreciated that if the walls of the separating units are made additionally thick to resist wear of abrasive dusts, this also may be considered conventional construction, since the wall thickness is independent of any gas pressures involved. Even though the separating units may be made of a single integral wall, the situation is strictly analogous to that where a thin-walled structure is provided with an internal liner which resists the abrasion of the suspended material. It should be appreciated that even though the separating units or other parts within my housings are made thicker than is required by consideration of pressure and dead weight alone, in order to resist wear, eventually the parts tend to be worn to a relatively thin wall, and might even wear through. Under this latter condition, units of conventional construction would not be capable of containing a gas stream maintained at a relatively high pressure, although it is possible to do so in my novel apparatus since the walls of the apparatus within the housings are not loaded appreciably by gas pressure.

In order to maintain pressures inside and outside of the relatively thin walls substantially equal to the high pressure I may provide one or more pressure equalizing openings in the parts of the apparatus. For example, I may provide an opening 81 in the upper partition 13 to equalize pressures on opposite sides thereof. Other openings may be provided in the vertically extending partitions 41 and 42 as indicated at 82 and 83 in order to equalize pressures on opposite sides of the partitions 14 and around the tubes of the separating units.

Consequently, although from a standpoint of ability to withstand differences of pressure, only the outer shell need be of heavy pressure resistant construction and the separating units and interior walls may be of relatively thin construction, it will be understood that it is within the scope of my invention to make the separating units or other interior walls of thick metal for the purpose of resisting wear by abrasive dusts or corrosive gases and prolonging the useful life of the apparatus.

It will also be understood that while I have referred to the forms of my invention as being particularly suited to the collection of suspended solid particles, all forms of the invention may be used without material changes for the collection of suspended liquid particles.

It should also be evident that numerous advantages of my invention may be realized when the housing 16 is made with thin walls instead of thick ones and gas is treated at low pressure. It should also be appreciated that several advantages of my compact multi-stage construction may be realized even though the outer housing 16 or 16a is omitted, suitable side wall means being substituted for the portions of the side wall 15 of the housing forming part of the passage 10. In this connection, suitable means is provided to conduct the gas to be cleaned to the inlet opening 11 of the passage 10. It is to be understood that my invention is not to be limited to placing the inlet and outlet openings 12 and 57 at positions shown in Fig. 1, or the corresponding openings shown in Fig. 3 when my multi-stage apparatus is enclosed in a housing. For example, the partition 14 may extend completely across the housing and the inlet opening 57 may be placed in the side wall 15 at a position between the partitions 13 and 14 adjacent the inlet of the first stage indicated at A. It should also be appreciated that the dust delivery tubes 51, 52 and 53 may extend outward of the housing 16 in the same manner as the tubes 51a, 52a, and 53a of Fig. 3.

Having described the various embodiments of my invention, it will be apparent that many changes may be made in the arrangement and location of parts without departing from the spirit and scope of my invention; and consequently, it is to be understood that I am not limited to the specific forms disclosed, but the foregoing description is to be considered as illustrative of, rather than limitative upon, the scope of the invented claim.

I claim:

Apparatus for separating suspended material from a stream of gas at high pressure, comprising a substantially vertically extending thick-walled cylindrical housing adapted to withstand the high internal pressure of the stream of gas and having a gas inlet and a gas outlet; vertically spaced horizontally extending upper and lower wall means cooperating with the housing to define a horizontally extending enclosure communicating at its ends with the interior of the housing and with the outlet respectively; a plurality of centrifugal separating stages located entirely within the housing and separated horizontally in a direction along said enclosure, each of said separating stages comprising a plurality of tubular centrifugal separating units each having gas inlet means communicating with said enclosure, and each having material discharge means; a separate partition for each of said stages extending completely across said enclosure and sloping downwardly in a direction toward the outlet end of the enclosure, said partitions extending over the separating units of the corresponding stages and separating the gas inlet means of the units in adjacent stages; a separate gas outlet tube for each unit, the gas outlet tubes of the units of each stage extending through the corresponding partition and communicating with said enclosure above said partition; and partition means within the housing defining a separate material discharge compartment for each stage, the material discharge means of each separating unit communicating with the discharge compartment corresponding to that stage; said inlet being located below said outlet and substantially on the same side of said housing, whereby gas is caused to flow upwardly across said housing before entering said enclosure; and said wall means, partition means, and separating units being so spaced and arranged that all parts thereof are subjected to substantially said high pressure of the gas stream.

PAUL C. RICH.